(12) United States Patent
Katzenelson et al.

(10) Patent No.: US 11,067,220 B2
(45) Date of Patent: Jul. 20, 2021

(54) REMOTE ANCHORING APPARATUS

(71) Applicant: HIGHNOVATE, Kiryat Tivon (IL)

(72) Inventors: Beeri Berl Katzenelson, Kiryat Tivon (IL); Idan Peretz, Shoham (IL); Eyal Mastboim, Raanana (IL)

(73) Assignee: HIGHNOVATE, Kiryat Tivon (IL)

( * ) Notice: Subject to any disclaimer, the term of this patent is extended or adjusted under 35 U.S.C. 154(b) by 0 days.

(21) Appl. No.: 16/475,406

(22) PCT Filed: Jan. 1, 2018

(86) PCT No.: PCT/IL2018/050003
§ 371 (c)(1),
(2) Date: Jul. 2, 2019

(87) PCT Pub. No.: WO2018/127908
PCT Pub. Date: Jul. 12, 2018

(65) Prior Publication Data
US 2019/0323656 A1    Oct. 24, 2019

(30) Foreign Application Priority Data

Jan. 3, 2017 (IL) .......................... 249921
Dec. 20, 2017 (IL) .......................... 256461

(51) Int. Cl.
F16M 13/00     (2006.01)
F16M 13/02     (2006.01)

(52) U.S. Cl.
CPC .................... F16M 13/02 (2013.01)

(58) Field of Classification Search
CPC ........... F16M 13/00; F16M 13/02; E06C 7/02
See application file for complete search history.

(56) References Cited

U.S. PATENT DOCUMENTS

| 2,053,018 | A | * | 9/1936 | Bell | ........................ | F16G 11/14 |
| | | | | | | 24/134 R |
| 4,323,725 | A | * | 4/1982 | Muller | ................. | H01R 13/585 |
| | | | | | | 174/135 |
| 4,459,931 | A | | 7/1984 | Glidden | | |
| 4,644,617 | A | | 2/1987 | Tupper | | |
| 2013/0298493 | A1 | | 11/2013 | Guthrie | | |
| 2016/0265623 | A1 | * | 9/2016 | Kingery | ................. | F16G 11/101 |

FOREIGN PATENT DOCUMENTS

| CN | 204387208 | 6/2015 |
| FR | 1600121 | 7/1970 |
| WO | WO 2014/083056 | 6/2014 |

OTHER PUBLICATIONS

International Search Report of Application No. PCT/IL2018/050003 dated May 9, 2018.
Supplementary European Search Report for EP App. No. 18736004 dated Mar. 16, 2021.

* cited by examiner

*Primary Examiner* — Amy J. Sterling
(74) *Attorney, Agent, or Firm* — Pearl Cohen Zedek Latzer Baratz LLP

(57) ABSTRACT

A remote anchoring apparatus is mad of two elements, an anchoring element and a connecting element. The connecting element is formed to be guided into a respective space made in the anchoring element and be locked in it. The connecting element may be guided towards the anchoring element by a flexible pulling means such as a rope pulled through the anchoring element.

7 Claims, 8 Drawing Sheets

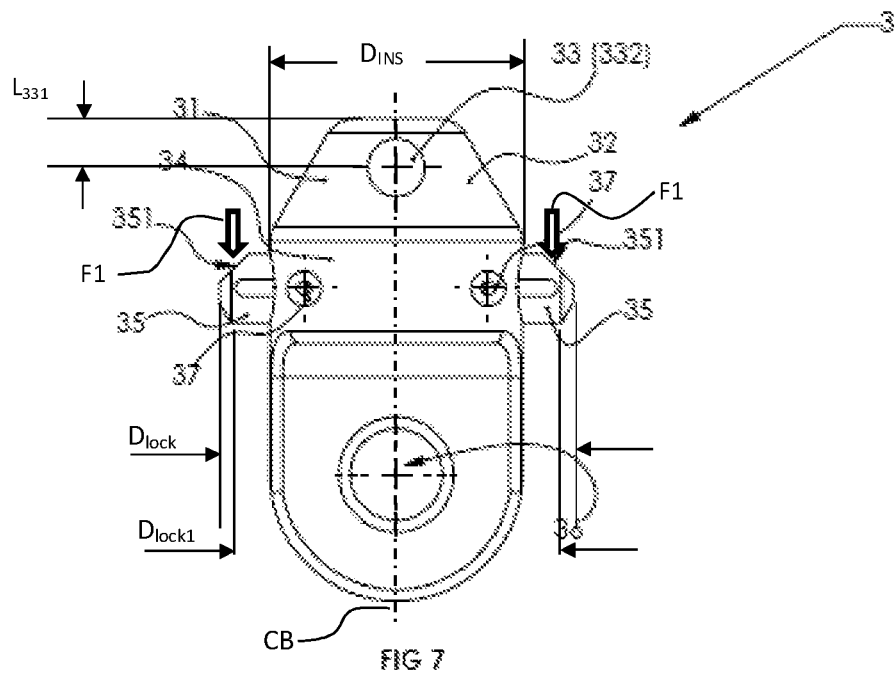
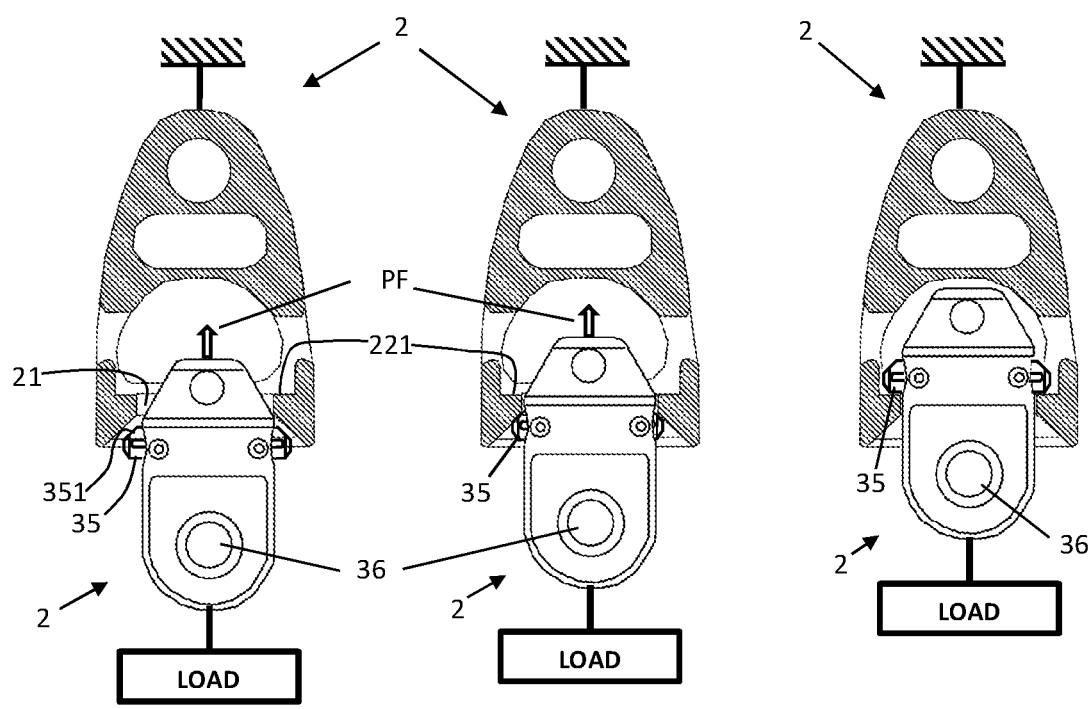

B-B

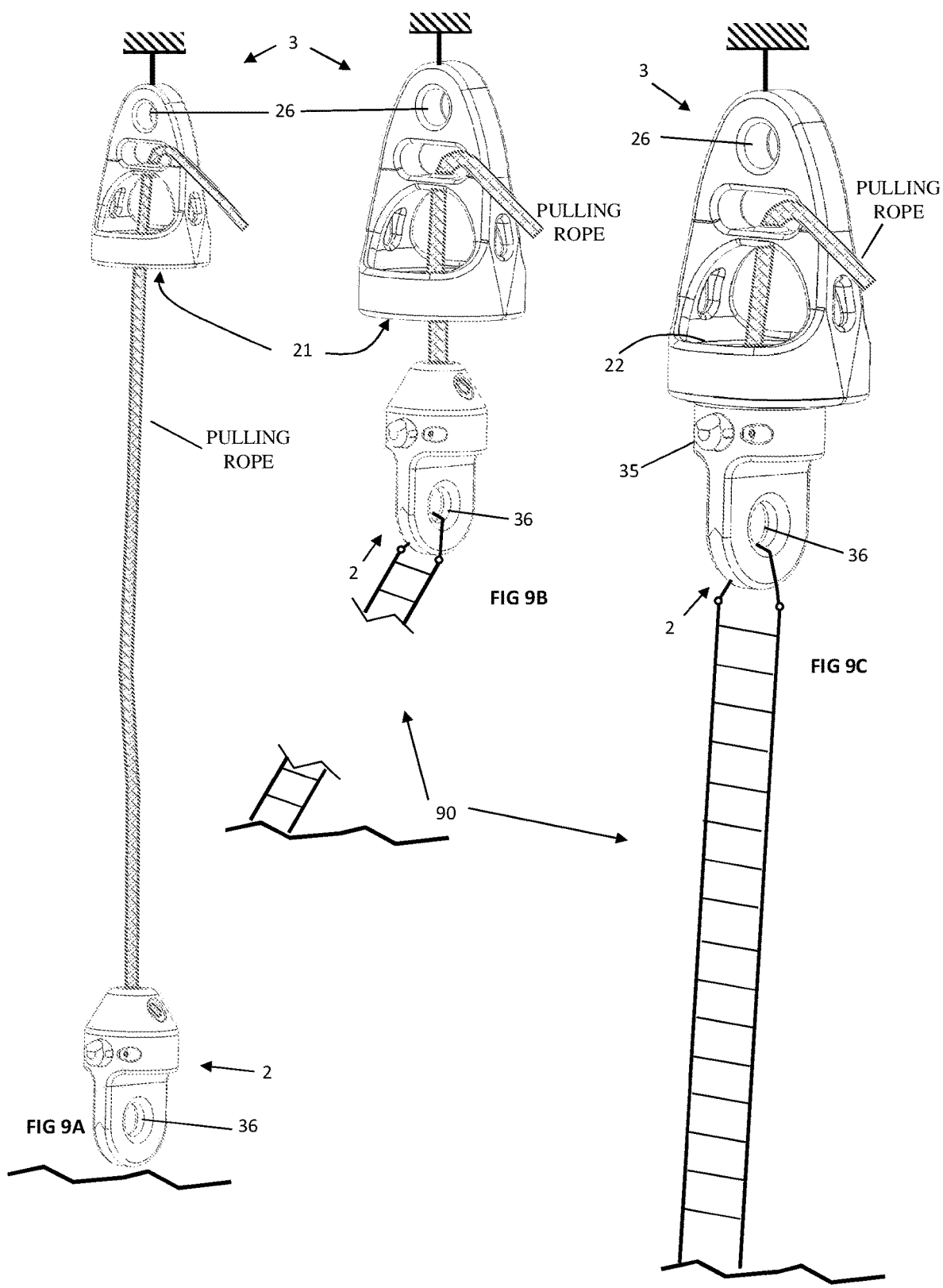

REMOTE ANCHORING APPARATUS

CROSS-REFERENCE TO RELATED APPLICATIONS

This application is a National Phase Application of PCT International Application No. PCT/IL2018/050003, International Filing Date Jan. 1, 2018, entitled "Remote Anchoring Apparatus", published on Jul. 12, 2018 as International Patent Application Publication No. WO 2018/127908, claiming priority of Israel Patent Application No. 249921 filed on Jan. 3, 2017 and Israel Patent Application No. 256461 filed on Dec. 20, 2017, all of which are incorporated herein by reference in their entirety.

BACKGROUND OF THE INVENTION

There are situations in which a relatively heavy equipment needs to be lifted to heights beyond ones' hands reach. For example, when a tall and heavy ladder needs to be carefully leaned against a remote support point (such as a high wall), or when a heavy and large object needs to be carried upwardly by a person climbing a ladder. Another example is when there is a need to bring heavy equipment to the top of a very high antenna, for example new equipment to be installed there, or maintenance equipment for testing the equipment at the top of the antenna, and the like.

In such situations, there is a need to enable safe and easy lifting of heavy objects to large heights in a safe manner, by providing easy, safe and single-man operable means and method to provide anchoring point adapted to enable lifting of heavy loads.

SUMMARY OF THE INVENTION

A remote anchoring apparatus is provided, the apparatus comprising an anchoring element and a connecting element. The anchoring element comprising an anchoring unit at one end of the anchoring element, an opening at the opposite end of the anchoring element, the opening forms an entrance to a reception section formed as a hollow space in the anchoring element, and is encircled by a bottom circumference element and a direction changing unit (DCU) suspended on the anchoring unit and adapted to allow the changing of direction of a flexible pulling means when under tension, wherein the DCU is adapted to direct a portion of a flexible pulling means passing through the opening substantially in the middle of the opening.

The connecting element comprising an insertion section that is adapted to fit into the reception section of the anchoring element and to allow smooth insertion thereof, wherein the insertion of the connecting element into the anchoring element is adapted to be performed remotely from a user, wherein the connecting element is adapted to be inserted into the anchoring element at an insertion angle between zero to 35 degrees and preferably between zero and 45 degrees with respect to the longitudinal axis of the anchoring element, wherein the connecting element is adapted to be securely locked to the anchoring element via at least one springy pin, and wherein the locking is adapted to be performed remotely from the user.

In some embodiments, the remote anchoring apparatus may further comprise a flexible pulling means, which is adapted to be connected at one end to the connecting element and to be threaded through the opening of the anchoring element, so that the connecting element is lead towards the opening of the anchoring element when the flexible pulling means is pulled through the anchoring element.

In some embodiments, the connecting element may be inserted into the reception section of the anchoring element.

In further embodiments, the connecting element may be locked to the anchoring element.

In yet additional embodiments the flexible pulling element is one from a list comprising a rope, a cable and a chain.

In some embodiments, the anchoring element may comprise a cone with a wider end closer to the bottom end and diameter gradually getting smaller as much as getting farther from the bottom end of the anchoring element towards its top end.

In some embodiments, the DCU is located between the anchoring unit and the opening substantially along the longitudinal axis of the anchoring element.

A method for anchoring an object to a remote location by an operator using an anchoring apparatus is disclosed, the method comprising providing an anchoring element of the anchoring apparatus and a connecting element of the anchoring apparatus, the anchoring element and the connecting element adapted to be engaged with each other, threading a flexible pulling means through a pulling means hole in connecting element and securing a shorter end of the puling element from being pulled out of the hole, threading the longer end of the flexible pulling means through a pulling path in the anchoring element, lifting the anchoring element to an anchoring location and affixing it there, while ensuring that the flexible pulling means passes through the pulling path and reaches the operator, attaching the object to the connecting element, pulling the flexible pulling element thereby bringing the connecting element towards the anchoring element and continuing pulling the flexible pulling means to force the connecting element to pass through an opening in the anchoring element thereby safely locking the connecting element in the anchoring element.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 7 is a side view of the connecting element of FIG. 6, as seen from the direction indicated in FIG. 6, according to embodiments of the present invention;

FIGS. 7A-7C schematically depict three consecutive stages of engaging a connecting element to an anchoring element from the beginning of the engagement to fully engaged position, respectively, according to embodiments of the present invention;

FIGS. 9A-9C are schematic illustrations depicting three consecutive steps of anchoring connecting element to an anchoring element, according to embodiments of the present invention;

Figure 1:
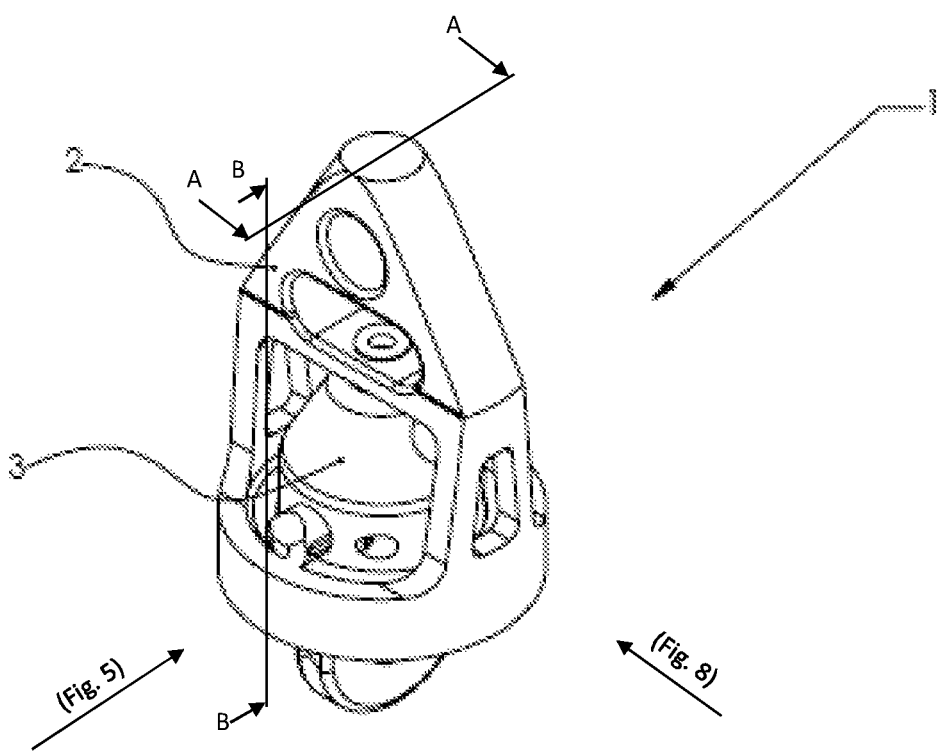
FIG. 1 is a schematic perspective drawing of an anchoring apparatus in position in which the connecting element is engaged with the anchoring element, in an elevated view, according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. As an example of a well-known method, one can use (together with the present invention or without it) a pulley or a block and tackle.

In order to enable easy and safe means and method for anchoring and securing heavy and/or large objects to high locations benefit is taken, according to embodiments of the present invention, of the fact that a small and light-weight anchoring element may be carried safely and easily by a single person to any desired high securing location, may then be secured, and then enable pulling by a light-weight, thin and strong enough rope, a connecting element from the base level towards the anchoring element, until the connecting element reaches the anchoring element and securely attached to it. Any heavy and/or large object that is attached to the connecting element is easily pulled by the rope and when the connecting element is securely locked to the anchoring element, thereby forming an anchoring apparatus, the load or object are properly secured, due to the fact that the anchoring element is well secured at the high. The rope may be selected to be as light weight as possible and still adapted to withstand sufficient pulling force to pull up the load/object that need to be secured and anchored. According to some embodiments the rope may be pulled from the ground/base level, after the anchoring element has been properly attached to the high/remote location. According to this embodiment during installation of the anchoring element the only weight that has to be carried by the person installing the anchoring element is that of the anchoring element itself and the self-weight of the rope with length of less than twice the distance of the anchoring point from the ground/base.

A remote anchoring apparatus according to embodiments of the present invention may comprise of two main elements, an anchoring element and a connecting element. The anchoring element is designed to be relatively light weight and have relatively small physical dimensions to enable easy carrying and anchoring onto support structure or construction at high locations. The anchoring element is formed with a reception section adapted to self-lead a corresponding portion of the connection element when the connecting element is inserted into the anchoring element. The connecting element is formed with an insertion section adapted to enable the connecting element to be self-lead into the reception section of the anchoring element. The connecting element is further adapted to be securely lock to the anchoring element after it was self-lead into the reception section of the anchoring element. The term "self-lead" as used here relates to operations that does not require direct manual intervention by a human, but rather may be operated from remote.

According to some embodiments the connecting element may be lead towards the anchoring element, may be inserted into the reception section of the anchoring element and the locking feature may be activated—all or part of which—solely using a pulling rope operated (i.e. pulled) from remote, as is explained in details below.

Reference is made to FIG. 1, which is a schematic perspective drawing of anchoring apparatus 1 shown in position in which connecting element 3 is engaged with anchoring element 2, in an elevated view, according to embodiments of the present invention. According to embodiments of the invention the position shown in FIG. 1 is obtained, for example, when connecting element 3 has been inserted into the reception section of anchoring element 2 and was locked to it, as explained below in details.

Figure 2:
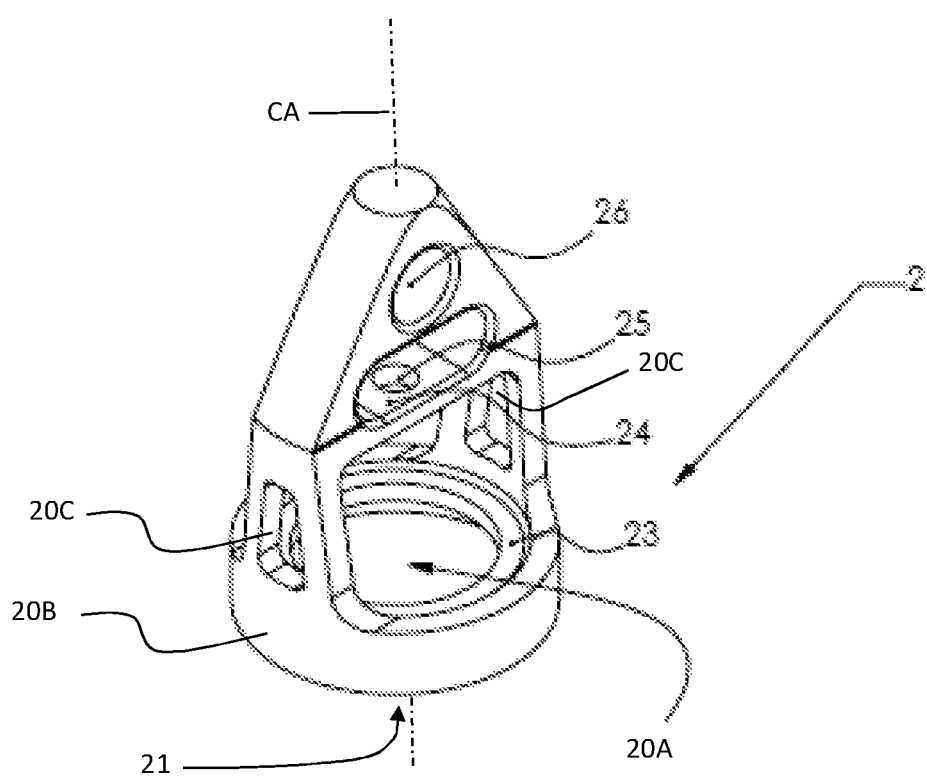
FIG. 2 is a schematic perspective drawing of the anchoring element of FIG. 1 in an elevated view, according to embodiments of the present invention.
Figure 3:
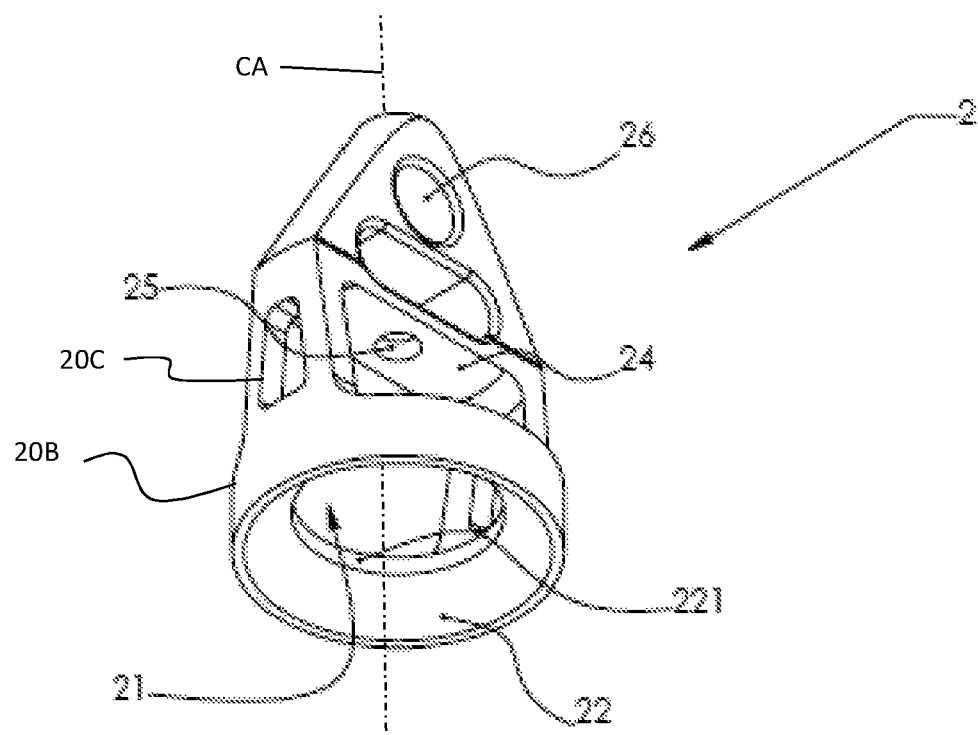
FIG. 3 is a schematic perspective drawing of the anchoring element of FIG. 2 in a lowered view, according to embodiments of the present invention.

Reference is made now to FIGS. 2 and 3, which are a schematic perspective drawings of anchoring element 3 of FIG. 1 in an elevated view and in a lowered view, respectively, according to embodiments of the present invention. Anchoring element 3 may be formed as unit having hanging or attachment arrangement, or means 26 at one end denoted top end and opening 21 at its opposite end, denoted bottom end. Opening 21 may form the entrance to reception section 20A formed as a hollow space in the body of anchoring element 2. Opening 21 is encircled by bottom circumference element 20B. Between reception section 20A and anchoring means 26 pulling rope hole (PRH) 25 is located preferably centralized along central axis CA. PRH 25 is formed in bridging element 24 extending from one side to an opposite side of anchoring element 2. Bridging means 24 leaves space between it and anchoring means 26 so as to enable a rope (or similar cable, chain or any other flexible pulling means) to be inserted through PRH 25 from the bottom side, to be bent sideways when exiting hole 25 from the top side and extend outside of anchoring element 3 and to be pulled therefrom. According to embodiments of the invention locating PRH 25 substantially centered around central axis CA is required in order to ensure uninterrupted insertion of connecting element 3 through opening 21 and/or secured locking of connecting element 3 to anchoring element 2, as is explained in details below.

The exact size of anchoring element, the materials it is made of, the size of anchoring means hole 26, the size of PRH 25, the space left for a rope exiting PRH 25 upwardly for bending sideways, etc. may be determined according to requirements exerted on remote anchoring apparatus 1, such as the maximal expected load it should be adapted to stand, during lifting the load towards anchoring and later during use of the anchored load, the maximal weight of the anchoring element 2 to allow easy and safe carrying up of anchoring element 2 toward the anchoring point, etc. Under such design requirements light weight and strong material may be chosen, some volume of material the anchoring element 3 is made of may be removed, for example cavities 20C, so as to maintain at least minimal load carrying capacity while using only the required amount of mass of anchoring element 2.

Anchoring element may be adapted to be anchored, or attached to a support structure or object via anchoring, or hanging means 26, which may be shaped, for example, as a hanging cavity or hole that enables hanging or anchoring element 3 to a support structure. Hanging means hole 26 may be located close to one end of anchoring element 2.

Figure 4:
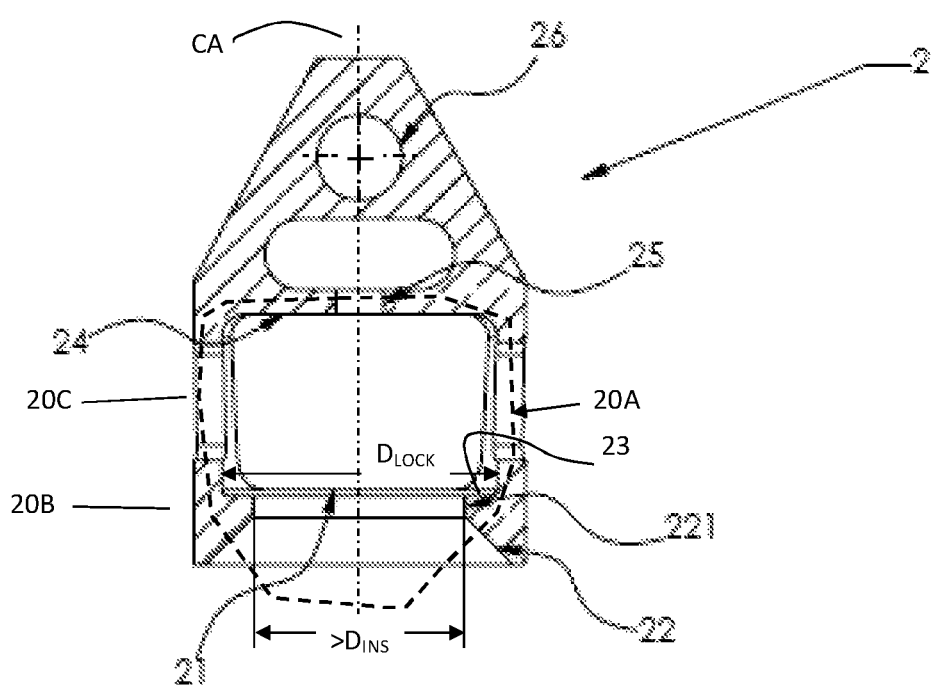
FIG. 4 is a cross section view of the anchoring element of FIGS. 2-3, according to embodiments of the present invention.

Reference is made now also to FIG. 4, which is a cross section view of anchoring element 2 in plane A-A (FIG. 1), according to embodiments of the present invention. Reception section 20A is circled by closed loop dashed line. Opening 21 may comprise two sectors. The outer sector may be configured as a cone with the wider end facing out of anchoring element 2 and its diameter gradually getting smaller as much as getting farther from the bottom end of anchoring element 2 towards its top end. Conical sector or sloping circumferential ring 22 is disposed at the very bottom end of opening 21 with its wider section pointing outwardly from reception section 20A. Conical sector 22 reaches a minimal diameter $D_{INS}$ that is large enough to enable smooth and uninterrupted entrance of connecting element 3 into reception section 20A. Conical sector 22 is formed to lead and enable smooth entrance of connecting element 3 into anchoring element 2, as is explained in details below. The upper, or inner end 221 of conical sector 22 ends with flat peripheral rim 23 forming a circumferential flat ring having its face disposed in a plane perpendicular to the longitudinal axis CA, an inner opening diameter slightly bigger than the outer diameter $D_{INS}$ (FIG. 7) of connecting element 2.

Opening 21 further comprise upper edge 221 extending from the upper end of cone 22 and forming a ring-like sector. The inner diameter of the ring-like sector complies with the same requirements implied on the inner diameter of the upper end of cone 22 with respect to smooth insertion of connecting element 3. Upper edge 221 is adapted to provide stopping support to locking springy pins 35 of connecting element 3, as is explained below. The diameter of reception section 20A right above upper edge 221 is at least DLOCK which is larger than Dlock of locking springy pins 35 (see FIG. 7), to ensure safe locking of connecting element 3 to anchoring element 2 at the end of insertion.

Opening 21, ring like section and upper edge 221 and flat peripheral rim 23 having diameter $D_{LOCK}$ are all made preferably with radial symmetry around longitudinal central axis CA, to enable smooth and easy insertion of connecting element 3 into anchoring element 2 indifferent of the actual relative radial angle of connecting element 3 with respect to anchoring element 2 at time of insertion of connecting element 3 into anchoring element 2.

Figure 5:
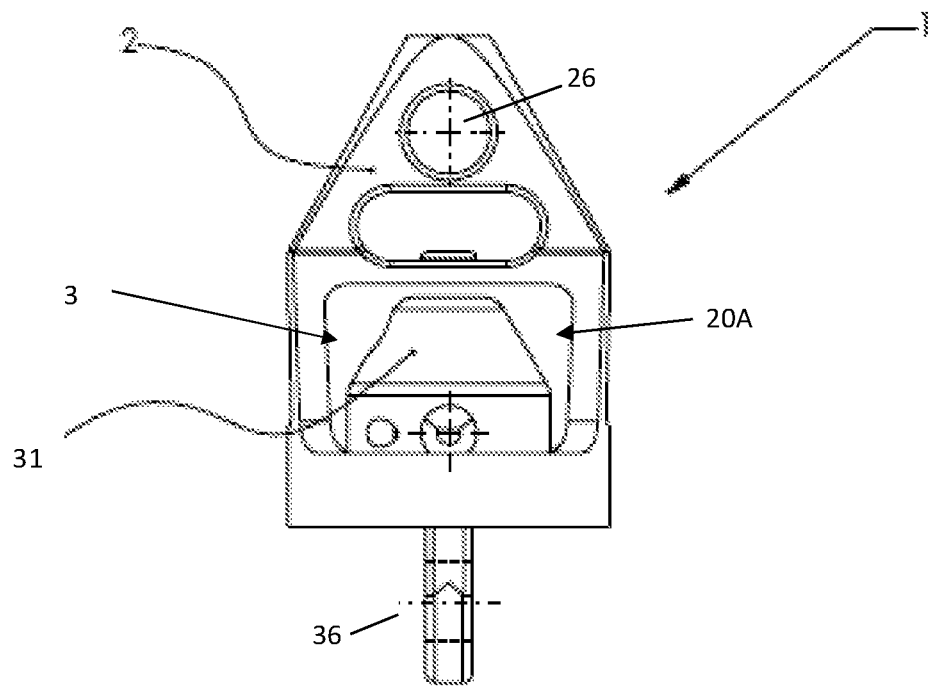
FIG. 5 is a schematic side view of the anchoring apparatus of FIG. 1 as seen from the direction indicated in FIG. 1 engaged with connecting element 3 in fully engaged position, according to embodiments of the present invention.

Reference is made to FIG. 5, which is a schematic side view of the anchoring apparatus of FIG. 1 as seen from the direction indicated in FIG. 1 engaged with connecting element 3 in fully engaged position, according to embodiments of the present invention. In fully engaged position connecting element 3 is securely connected to anchoring element 2 thereby anchoring hole 26 and hanging hole 36 are connected to each other thereby providing rigid connection between them, as is explained in details below.

Figure 6:
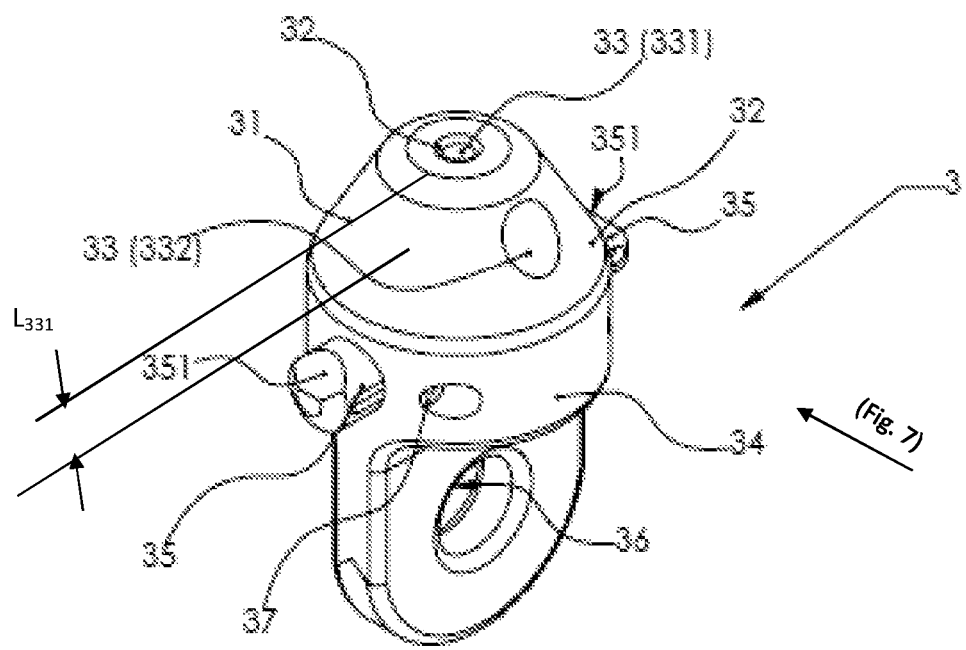
FIG. 6 is a schematic perspective elevated view and side view of the connecting element of FIG. 1, according to embodiments of the present invention.

Reference is made now to FIG. 6 and FIG. 7 which are schematic perspective elevated view and side view, respectively, of connecting element 3 of FIG. 1, according to embodiments of the present invention. Connecting element 3 may be formed, preferably, as a cylindrical object having conical shaped portion 31 at its upper end and having a diameter $D_{INS}$ at its lower end, the diameter is adapted to be smoothly and easily inserted into reception section 20A via opening 21 of anchoring element 2. Conical portion 31 may have a hole 33 comprising first part 331 made through its vertex and along connecting element 3 longitudinal axis CB, extending $L_{331}$ into conical portion 31, and second part hole 332 extending from a side face of conical portion 31 towards central longitudinal axis CB and meeting hole 331 substantially perpendicular to hole 331, thereby forming a continuous opening that runs through both holes. Hole 33 is adapted to enable threading of pulling means such as a rope through it so that its longer end extends out of first part hole 331 and its shorter end extends out of second part hole 332 and enabling securing the pulling means from being threaded out from hole 33 under tension, for example by making a tie at the shorter end.

Conical portion 31 ends, at its bottom end, with a cylindrical sector 34 having a diameter similar to the maximal diameter of conical portion 31. At least one springy pin 35, and preferably two or more, are disposed extending from the circumference of cylindrical sector 34 and perpendicular to the face of the cylindrical sector outwardly. Pins 35 are made each with spring that pushes the pin outwardly. Pins 35 are adapted to extend out of cylindrical sector 34, when no force is exerted on them, inwardly to reach a position in which the distance between the outer ends of two opposing pins 35 is $D_{LOCK}$, which is greater than $D_{INS}$.

Each of pins 35 is spring loaded and is designed to extend outwardly in rest position and be pushed inwardly into the body of connecting element 2 when force is exerted on the pins directed along the longitudinal axis of the pins against the loaded spring. Each of pins 35 is adapted to retract inwardly under retracting force so that when two opposing pins are retracted the distance between their outer ends is less than $D_{INS}$. Each of pins 35 has an inclined area 351 formed at its outer end which is facing to upwardly the side of cone 31 so that its outermost end is lower than its innermost end with respect to cone 31 vertex. Inclined areas 351 are made so that when force F1 is exerted onto the inclined area it translates, due to the inclination, to perpendicular force pushing the pin into connecting element 3. Such force may be exerted, for example, when connecting element 3 is inserted into anchoring element 2 via opening 21 and pins 35 meet sloping circumferential ring 22, as is explained in details below.

Each of pins 35 may be shaped as a short cylindrical or any other longitudinal shaped object at most of its length from its inner part being in active connection with a return spring (not shown) and may have formed at its outer end inclined area 351 as explained above. The cylindrically, or elongated portion of pin 35 may extend outside of the cylindrical area of cylindrical sector 34 at length of $D_{LOCK1}$ as measured from the outer end of this portion of one pin to the same place on the opposite pin. The distance $D_{LOCK1}$ may be slightly smaller than $D_{LOCK}$, and at least to some extent longer than $D_{INS}$, to ensure secured attachment of connecting element 3 to anchoring element 2.

Reference is made now to FIGS. 7A-7C, which schematically depict three consecutive stages of engaging connecting element 3 to anchoring element 2 from the beginning of the engagement to fully engaged position, respectively, according to embodiments of the present invention. FIG. 7A shows an initial engagement step at which connecting element 3 is pulled by a pulling force PF from the vertex of connecting element 3 into reception section 20A via opening 21. As seen in this drawing, pins 35 are just about to meet circumferential conical ring 22.

FIG. 7B shows an intermediate engagement step at which connecting element 3 is further pulled by a pulling force PF from the vertex of connecting element 3 into reception section 20A via opening 21. Pins 35 are now partially pushed inwardly into the body of connecting element 3 due to the fact that their inclined areas 351 meet now a portion of circumferential conical ring 22 with a smaller diameter, which exerts force onto pins 35 against their return springs.

When connecting element 3 is further pulled into anchoring element 2, the lower side of pins 235 passes by and exceeds the plane at which the plane of flat peripheral ring 23 and the force of the return spring(s) causes pins 35 to extend outwardly, thereby to exceed the inner diameter of peripheral ring 23 and, as a result, to prevent pulling out connecting element 3 from anchoring element 2, unless pins 35 are again being pressed inwardly, for example by a manual intervention. It would be apparent those skilled in the art that certain elements that were described above may have different form and/or dimension as long as the opening in anchoring element 2 is made to allow the connecting element 3 to be inserted into a reception section and to be locked therein at the end of insertion. It would be apparent that the conical form of the upper (or leading) end of the connecting element 3 has an advantage since it ensures easy and uninterrupted insertion of the connecting element 3 into the anchoring element 2.

Figure 8:
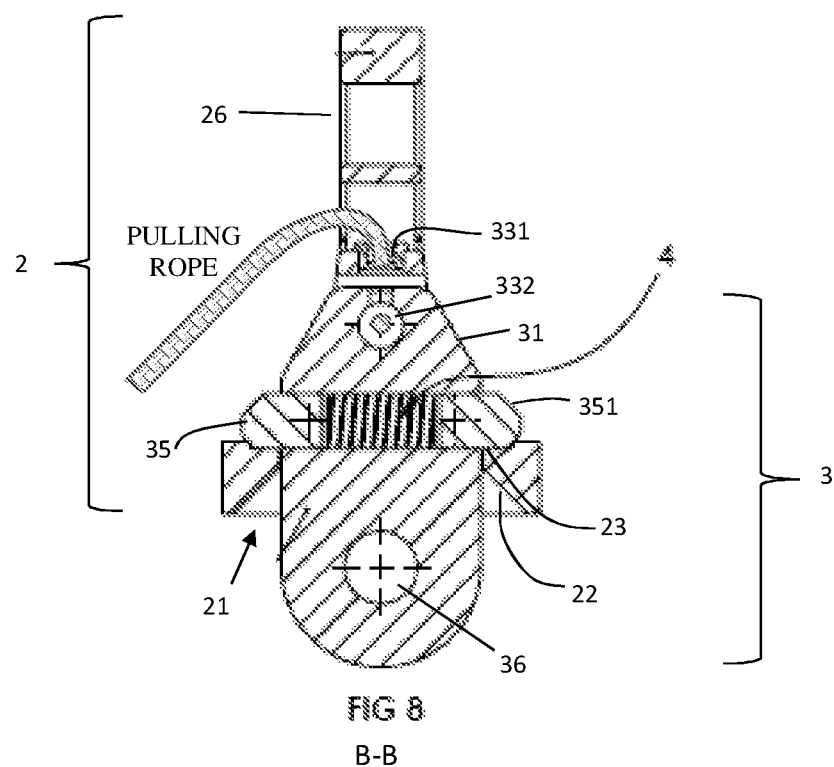
FIG. 8 is a schematic cross section view of the anchoring apparatus of FIG. 1, made in plane B-B indicated in FIG. 1, according to embodiments of the present invention.

Reference is made now to FIG. 8, which is a schematic cross section view of the anchoring apparatus of FIG. 1, made in plane A-A indicated in FIG. 1, according to embodiments of the present invention. The cross section of this drawing is made along section line B-B as shown in FIG. 1 and the direction of view is indicated there as well. Anchoring apparatus 1 is shown in this drawing in its full engagement state, where connecting element 3 is fully inserted into anchoring element 2 and locked to it. After connecting element 3 has passed through opening 21, pins 35 are free to extend back outwardly and lean over rim 23, thereby preventing disconnection of connecting element 3 from anchoring element 2, and making anchoring hole 26 firmly connected to connecting hole 36, to provide anchored hanging or attaching device.

Reference is made now to FIGS. 9A-9C, which schematically depict three consecutive steps of anchoring connecting element 3 to an anchoring element 3, according to embodiments of the present invention. Reference is made now also to FIG. 10, which is a schematic flow diagram of a method for anchoring a heavy and/or large object, a ladder in this example, to a high anchoring point, according to embodiments of the present invention. In order to enable easy, safe and simple attaching of heavy and/or large object to a high anchoring point an anchoring apparatus, such as apparatus 1, is provided (step 1002). A pulling rope is threaded through rope connecting holes 331 and 332 in connecting element 3 and is firmly secured there, as described in details below and the other end of the pulling rope is threaded through rope threading hole 25, leaving its free end loose for pulling, for example, by hand at later stage (step 1004). Anchoring element 2 is lifted up and is secured to an anchoring location, while making sure that the rope is maintained threaded through hole 25 and connecting element is left connected but no load is exerted on the pulling rope (step 1006, FIG. 9A). At this stage a load that needs to be pulled up and secured, such as a long ladder, is attached to connecting element 3 at its hanging hole 36 (step 1008). After the load has been attached to connecting element 3 the pulling rope may be pulled by a user, which may be located at any desired, or convenient location as long as the free end of the pulling rope is at reach there. The pulled rope is pulled through threading hole 25 in anchoring element 2 thereby pulling connecting element 2, and the load connected to it, towards anchoring element 3 (step 1010, FIG. 9B). The rope is kept being pulled by the user until connecting element 2 reaches the bottom entry 21 of anchoring element 2, inserted into it and is locked inside anchoring element 2 (step 10, FIG. 9C and FIGS. 7A-7C). At the end of the operation connecting element 3 is locked inside anchoring element 2 and thereby anchored to the anchoring location of anchoring element 2 and this way provides safe and secured support to the load, such as a long ladder. At this stage the pulling rope may be released from anchoring device 1 and be used for other needs, without effecting the support anchoring device provides to the load.

Figures 9D, 9E:
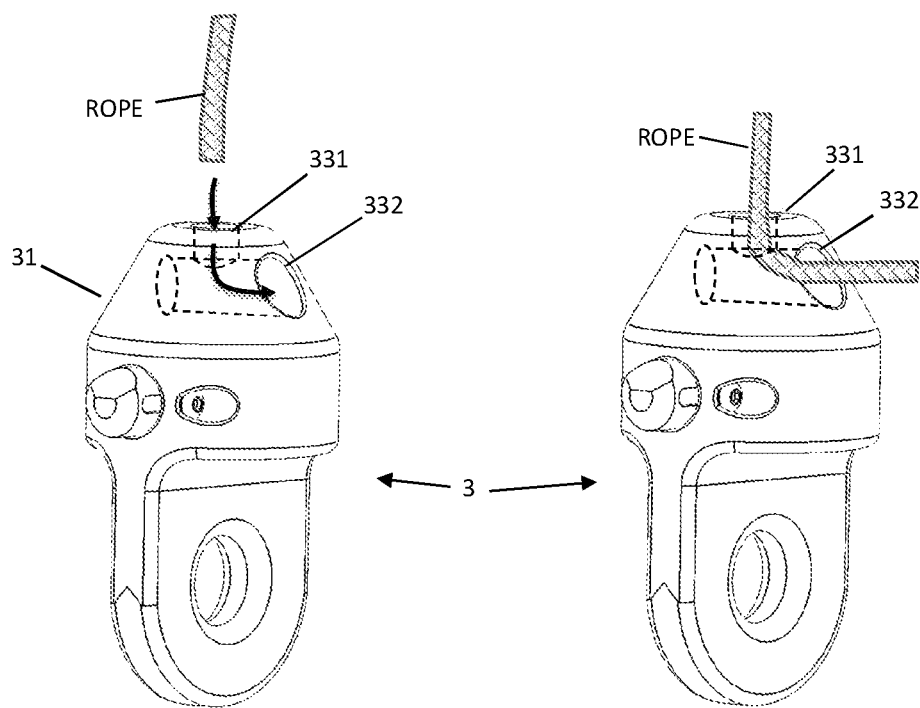
FIGS. 9D-9F are schematic illustrations depicting of three consecutive steps of attaching a rope to a connecting element, according to embodiments of the present invention.
Figure 9F:
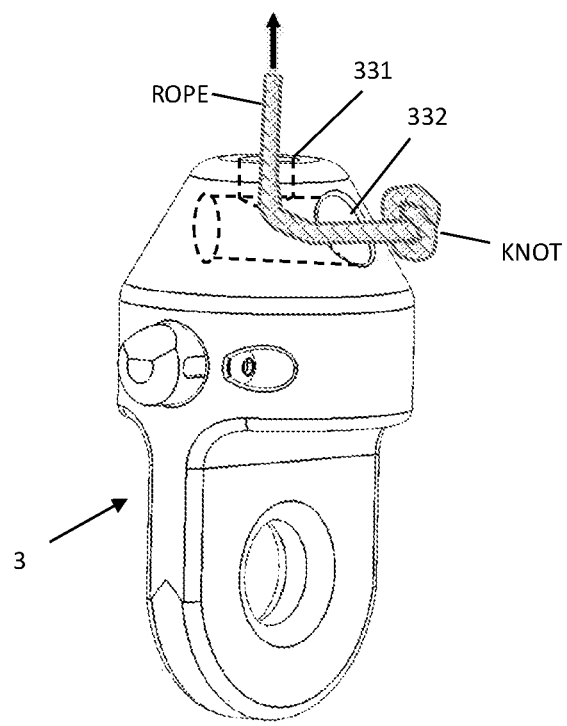
Figure 10:
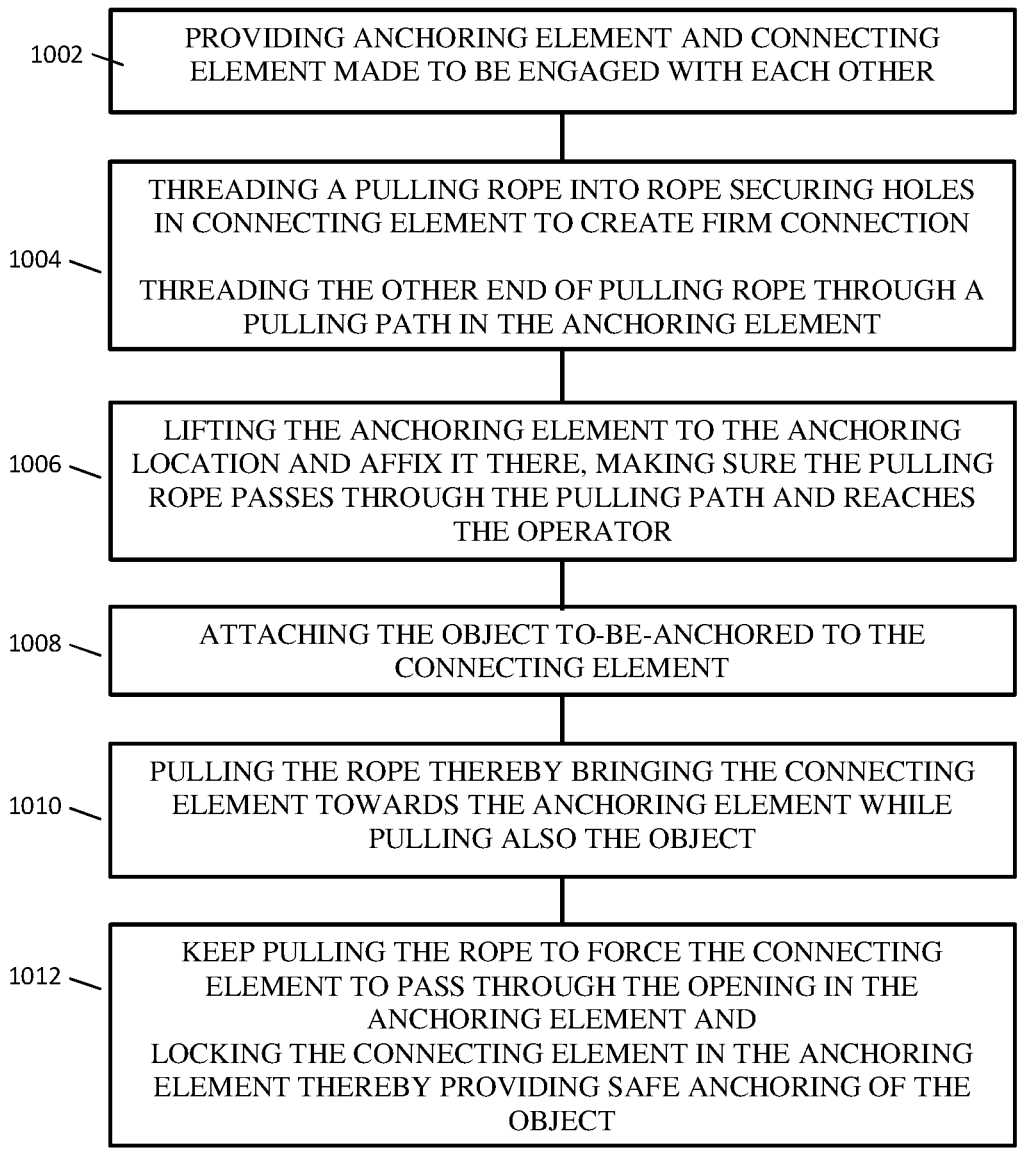
FIG. 10 is a schematic flow diagram of a method for anchoring a heavy and/or large object, a ladder in this example, to a high anchoring point, according to embodiments of the present invention.

Reference is made now to FIGS. 9D-9F, which are schematic illustrations depicting three consecutive steps of attaching a rope to connecting element 3, according to embodiments of the present invention. Prior to beginning pulling connecting element 3 towards anchoring element 2, as described above, a pulling rope may be firmly attached to connecting element 2 as follows. Pulling rope may be inserted through hole 331 at the vertex of conical portion 31 and further through hole 332, as depicted by the arrow in FIG. 9D until its edge protrudes out of hole 332 as depicted in FIG. 9E. At this stage a knot may be made at the edge of the rope so as to prevent pulling it out of hole 332 when pulling force is exerted on the rope as depicted in FIG. 9F. Preferably the knot, or any other blocking means that is used, should not protrude out of the outer face of conical portion 31 when that edge of the rope as come to final position after being pulled in, in order to not present obstacle to smooth entrance of connecting element 3 into anchoring element 2, as described in details above.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:
1. A remote anchoring apparatus comprising:
an anchoring element comprising:
an anchoring unit at one end of the anchoring element, said anchoring unit adapted to allow the changing of direction of a flexible pulling means when under tension; and
an opening at the opposite end of the anchoring element, wherein the opening forms an entrance to a reception section formed as a hollow space in the anchoring element, and is encircled by a bottom circumference element;

wherein the anchoring unit is adapted to direct a portion of a flexible pulling means passing through the opening substantially in the middle of the opening, and wherein the anchoring element comprises a cone with a wider end closer to a bottom end thereof and a diameter gradually getting smaller as much as getting farther from the bottom end of the anchoring element towards a top end thereof; and a connecting element, which is formed with:
an insertion section that is adapted to fit into the reception section of the anchoring element and to allow smooth insertion thereof, wherein the insertion of the connecting element into the anchoring element is adapted to be performed remotely from a user, wherein the connecting element is adapted to be inserted into the anchoring element at an insertion angle between zero and 35 degrees with respect to the longitudinal axis of the anchoring element, wherein the connecting element is adapted to be securely locked to the anchoring element via at least one springy pin, and wherein the locking is adapted to be performed remotely from the user.

2. The apparatus of claim 1 further comprising a flexible pulling means, which is adapted to be connected at one end to the connecting element and to be threaded through the opening of the anchoring element, so that the connecting element is led towards the opening of the anchoring element when the flexible pulling means is pulled through the anchoring element.

3. The apparatus of claim 2, wherein the connecting element is inserted into the reception section of the anchoring element.

4. The apparatus of claim 3, wherein the connecting element is locked to the anchoring element.

5. The apparatus of claim 3 wherein the flexible pulling element is one from a list comprising a rope, a cable and a chain.

6. A method for anchoring object to a remote location by an operator using an anchoring apparatus, the method comprising:

providing an anchoring element of the anchoring apparatus and a connecting element of the anchoring apparatus, the anchoring element and the connecting element adapted to be engaged with each other;

threading a flexible pulling means through a pulling means hole in connecting element and securing a shorter end of the puling element from being pulled out of the hole;

threading the longer end of the flexible pulling means through a pulling path in the anchoring element;

lifting the anchoring element to an anchoring location and affixing it there, while ensuring that the flexible pulling means passes through the pulling path and reaches the operator;

attaching the object to the connecting element;

pulling the flexible pulling element thereby bringing the connecting element towards the anchoring element; and continuing pulling the flexible pulling means to force the connecting element to pass through an opening in the anchoring element thereby safely locking the connecting element in the anchoring element.

7. The method of claim 6 wherein the flexible pulling means is one of a rope, a cable and a chain.

* * * * *